Oct. 6, 1970  J. F. COTTER  3,532,484
GLASS BURN-OFF MACHINE
Filed Aug. 22, 1967  4 Sheets-Sheet 3
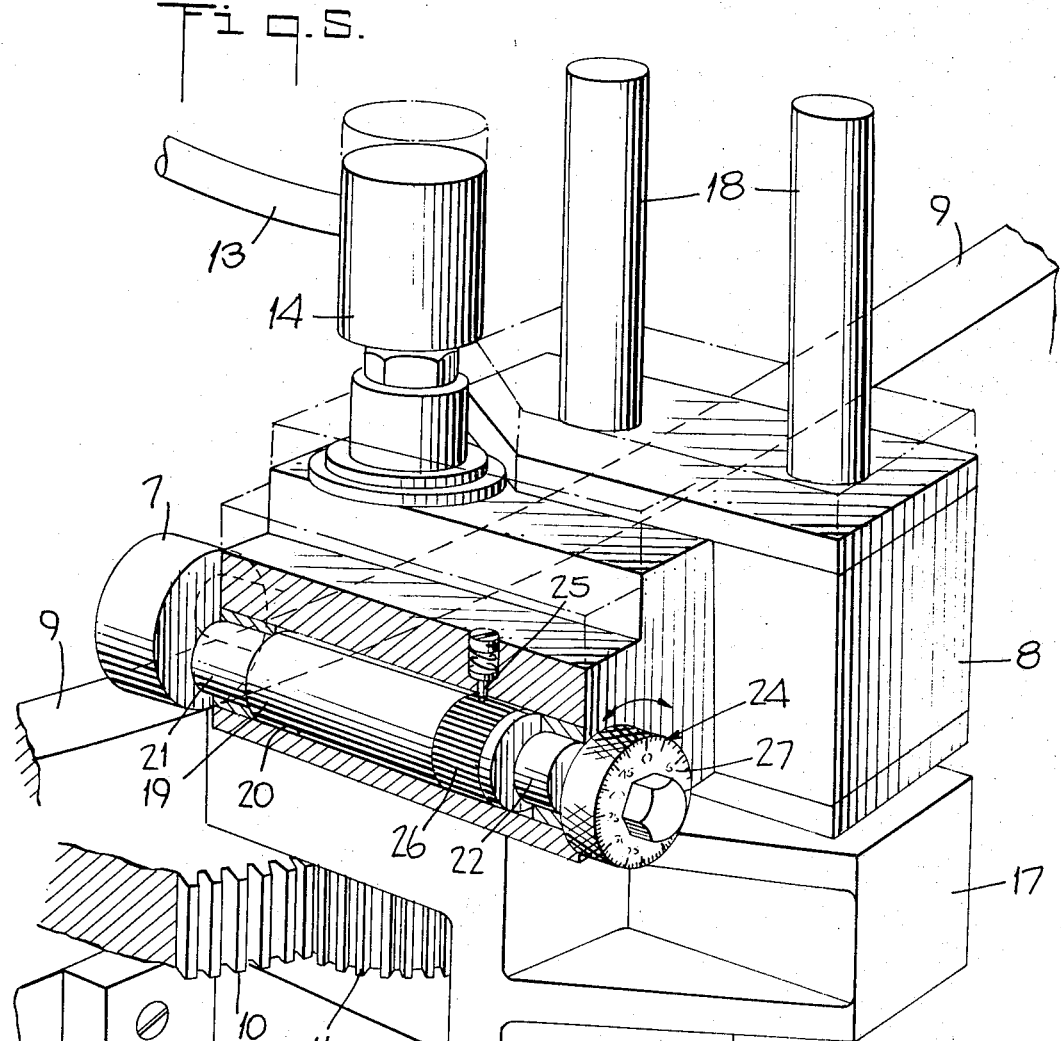
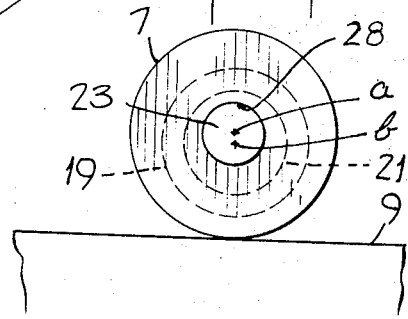
INVENTOR
JAMES F. COTTER
BY
Namond Hallow
ATTORNEY

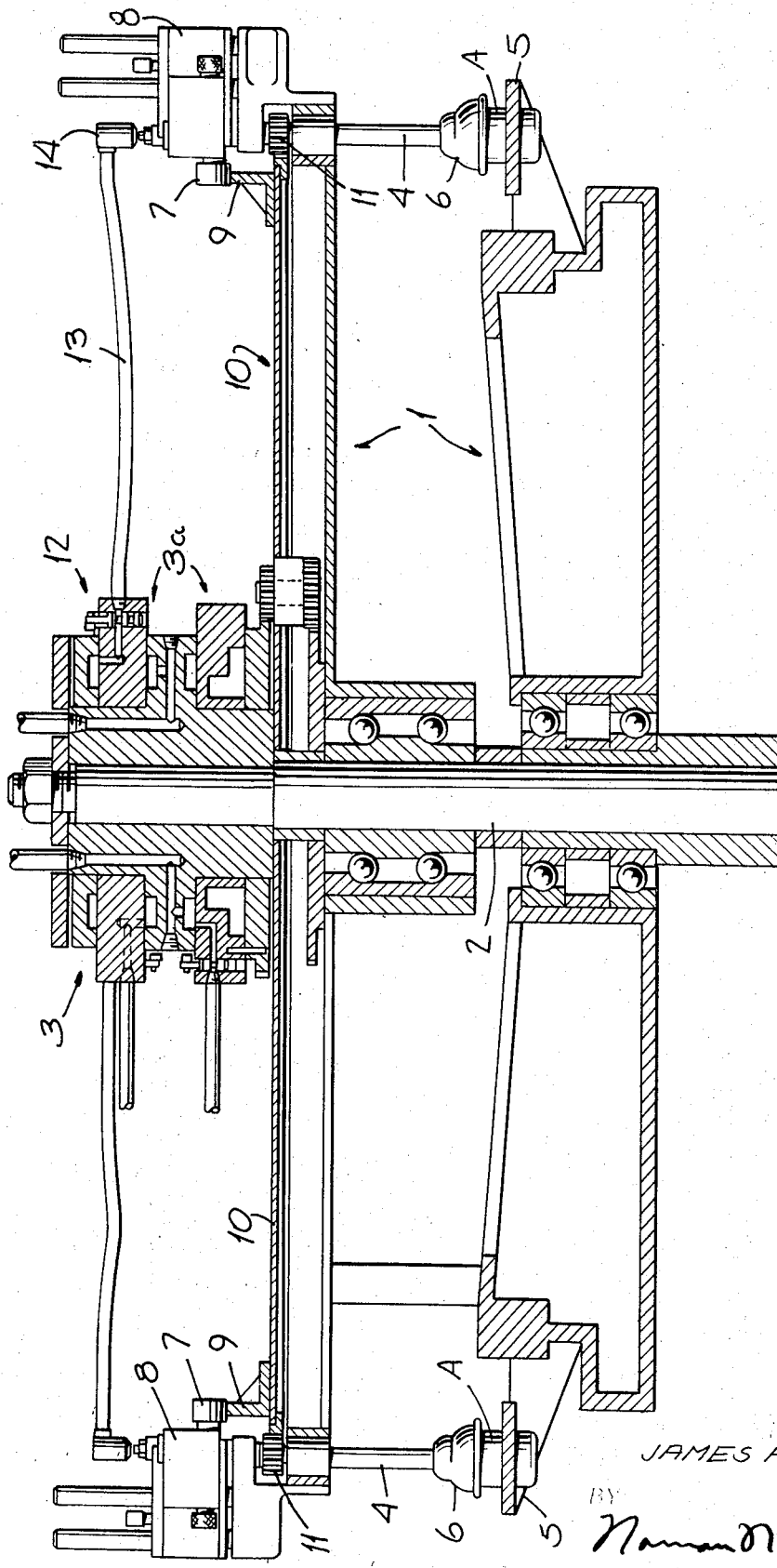

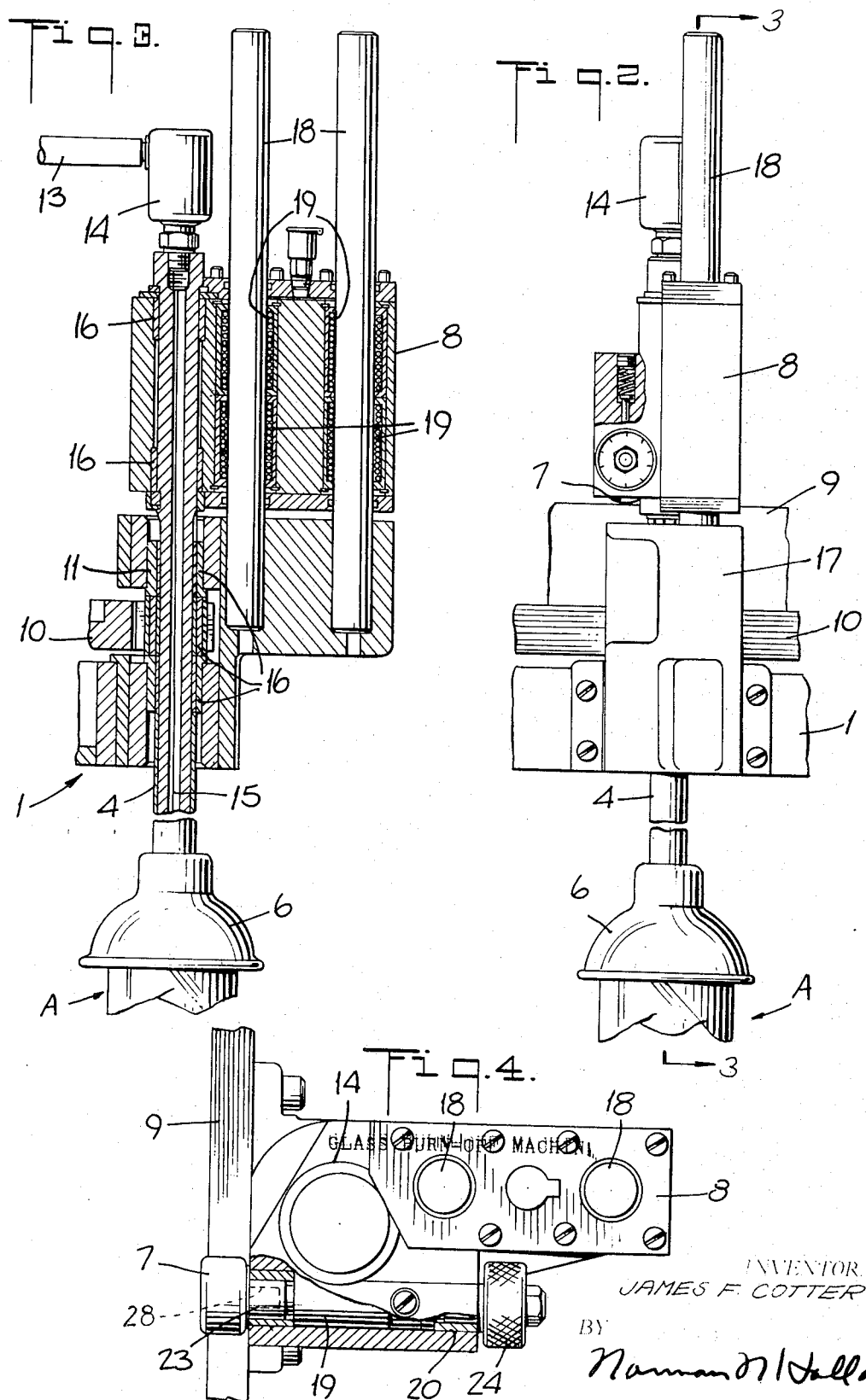

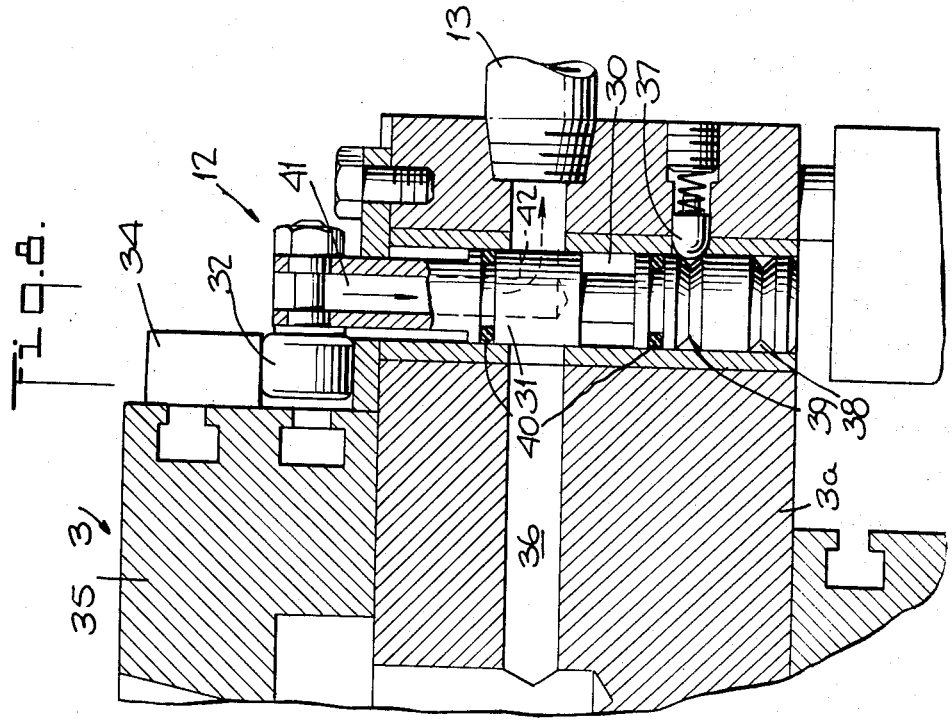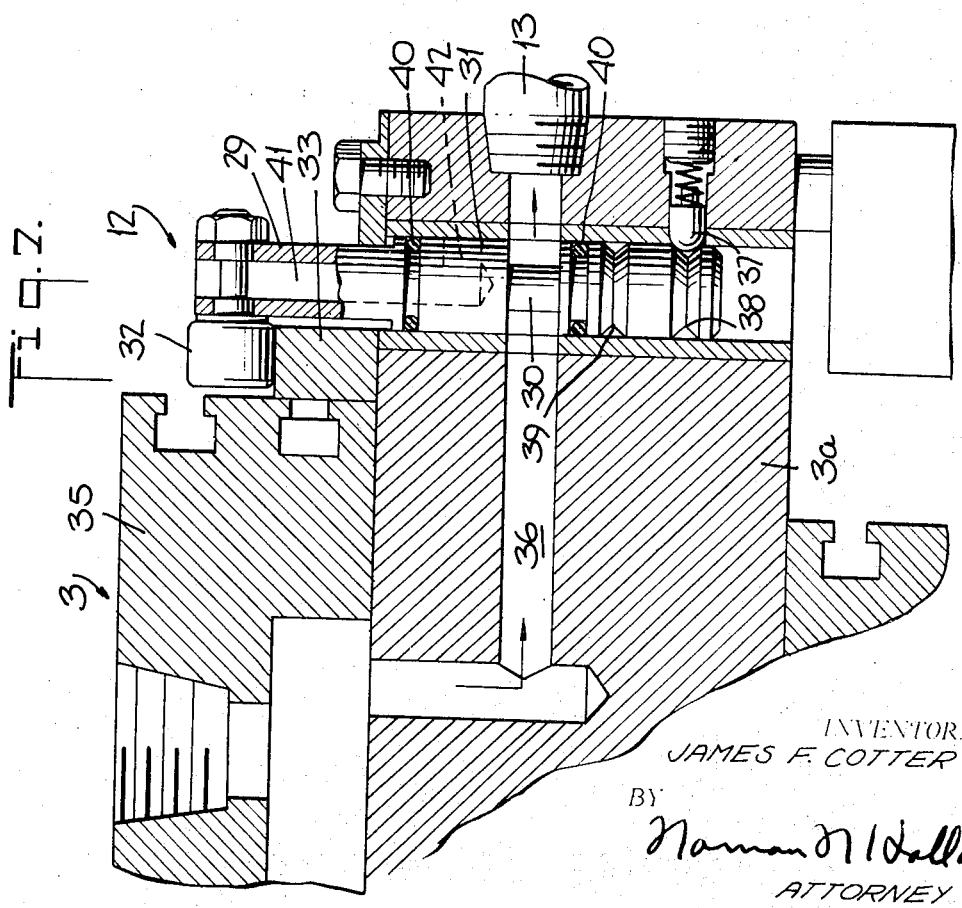

United States Patent Office 3,532,484
Patented Oct. 6, 1970

3,532,484
GLASS BURN-OFF MACHINE
James F. Cotter, Fairfield, Ohio, assignor to Anchor Hocking Corporation, Lancaster, Ohio, a corporation of Delaware
Filed Aug. 22, 1967, Ser. No. 662,347
Int. Cl. C03b 33/06
U.S. Cl. 65—260                                    15 Claims

ABSTRACT OF THE DISCLOSURE

An improved heat-resisting and cooling construction for the ware-holding system of a glass burn-off machine including a control valve in the vacuum system for the ware-holding spindle for communicating cooling atmospheric air to the spindle and ware-holding chuck when the valve cuts off the vacuum; a height-adjusting arrangement for the spindle with an adjustment shaft mounted on the spindle with an axially eccentric bore which receives the axle of the spindle-raising cam roller such that the height of the roller with respect to the spindle may be varied by rotative settings of the shaft; and heat resistant means for mounting the spindle for rotation and reciprocation in its mounting with said mounting means including a metal and graphite matrix impregnated with Teflon.

BACKGROUND OF THE INVENTION

The present invention relates to the glass making art and particularly to glass burn-off machines with heat-resisting improvements in the construction and arrangement of the ware-holding systems.

In the modern process of glassware manufacturing one of the steps in the making of containers and tumblers and the like is the removal of excess glass portions from the articles of ware coming from the molds. This operation is accomplished, by the use of a burn-off machine which picks the articles of ware from a conveyor and burns off the excess portions by the application of a burner flame before returning the ware to the conveyor for further processing.

These burn-off machines are generally constructed of a large rotary turrent which mounts a number of ware-holding spindles about its periphery and has an axially located distributor through which the various gases required for the burn-off process are supplied. To accomplish the actual burn-off each spindle has an associated ring burner into which the ware is inserted and rotated for a time during a cycle of turret rotation. Each spindle thus during each turret cycle has reciprocatory and rotational motion with respect to the turret.

In addition to the fuel lines to the ring burners a vacuum line is provided between the central distributor and each spindle for supplying a vacuum to a ware-holding chuck on the lower end of each spindle to hold the ware therein during the burn-off cycle.

As will be apparent from this general construction the spindle and chuck as well as the spindle mountings are subjected to extreme heat from the ring burner during the burn-off operation. The application of this extreme heat is an important cause of adjustment problems and breakdowns in this type of machine.

SUMMARY OF THE INVENTION

To overcome these heating problems certain improvements in the arrangement and construction of the ware-holding system have been designed and are the subject of the present invention. Firstly, an improved vacuum control valve is provided which will permit cooling atmospheric air to enter the heated vacuum spindle when the vacuum source is cut off by the closing of the valve to release the ware. An improved spindle height adjusting arrangement is also provided which permits the ready adjustment of the level limits of the spindle with respect to the mounting turret to compensate for changes in tolerances due to the heating effects. In addition, an improved bearing construction utilizing long lasting, heat-resistant self-lubricating material obviating the need for constant maintenance is included.

It is therefore an object of the present invention to provide improved heat-resisting features in a glass burn-off machine.

It is another object of the present invention to provide an improved ware-holding system in a glass burn-off machine.

It is another object of the present invention to provide improved valve means in the vacuum supply to the ware-holding system in a glass burn-off machine.

It is another object of the present invention to provide improved mounting means for the ware-holding spindle in a glass burn-off machine.

Another object of the present invention is to provide improved bearing means for mounting the ware-holding spindle on the turret of the glass burn-off machine.

A further object of the present invention is to provide an improved construction in a glass burn-off machine which achieves greater heat resistance and increased cooling effects.

Other and further objects of the invention will be obvious upon an understanding of the illustrative embodiment about to be described, or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a sectional view through the center of a glass burn-off machine of the type incorporating the present invention;

FIG. 2 is a side view of an improved spindle and mounting arrangement of the present invention;

FIG. 3 is a view in elevation of the improved ware-holding spindle and mounting of the present invention taken along the lines 3—3 in FIG. 2;

FIG. 4 is a plan view of the spindle and mounting of the present invention with portions broken away to show the adjacent shaft;

FIG. 5 is a perspective view of the improved spindle and mounting of the present invention showing the improved spindle height-adjusting arrangement;

FIG. 6 is an end view of the improved spindle height-adjusting arrangement showing the eccentricities of the roller and adjustment shaft axes;

FIG. 7 is a showing of the improved vacuum control valve mounted in the central manifold of the burn-off machine in the open position;

FIG. 8 is a view of the improved control valve as shown in FIG. 7 in the closed position.

DETAILED DESCRIPTION OF THE INVENTION

As shown in FIG. 1, the burn-off machine is constructed of a large rotating turret 1 mounted on a center post 2 which also supports the gas distributor 3 axially above the turret 1. The distributor 3 has a rotating manifold portion 3a. A number of ware-holding spindles 4 are mounted about the periphery of the turret 1 and rotate with it through the glass burn-off cycle. Each spindle 4 has an associated ring burner 5 mounted below it and into which the ware A is inserted during the burn-off operation. The steps in the burn-off cycle consist of the following successive stages. Firstly, the ware is picked off the conveyor (not shown), bringing it from the mold, by the spindle 4 which has a vacuum holding chuck 6 on its lower end. The spindle 4 then passes to the burn-off stage wherein the ware A is inserted within the ring burner 5 by the downward axial movement of the spindle 4. This downward movement is accomplished through the spindle raising or reciprocating means which comprises a roller member 7 on the spindle support 8 riding on a stationary cam surface 9. The cam surface 9 is mounted on the large fixed ring gear 10 which is positioned on the center post 2 directly above the rotating turret 1 and beneath the rotating distributor manifold 3a. This ring gear 10 also acts to rotate the spindle 4 about its axis through the gear 11 on the spindle shaft so that the ware A is continually rotated within the ring burner 5 during the burn-off process. After the excess glass has been burned off the ware A the spindle reciprocating roller 7 raises the spindle 4 and the ware A at the next station out of the ring burner 5 and the ware is then placed on a conveyor (not shown) to be passed to the next stage in the glass making process for further treating.

A vacuum is used to hold the ware in the chuck during the burn-off cycle and is cut off to release the ware after the burn-off process is completed. This vacuum is controlled by a valve 12 located on the rotating distributor manifold 3a. The vacuum acts through the line 13, connected to the rotary joint 14, at the top of the spindle 4, and through an axial bore 15 in the spindle which communicates with the ware holding chuck 6.

As shown in FIG. 3 the spindle shaft 4 is mounted on the turret 1 by means of improved heat resistant bearings 16 set within the appropriate steel bushings and bores in the support structure. The spindle support is constructed in two parts. The upper part of the spindle shaft 4 is fixed in a housing or support 8 and the lower part slides in the housing 17. This permits the height of the shaft 4 to be varied with respect to the lower mounting support 17 which is fixed to the rotary turret 1. Two columns 18 are provided with their lower ends fixed in the lower support 17 and on which the upper support 8 is disposed for vertical movement or reciprocation by means of appropriate roller bearings 19. The fixed ring gear 10 cooperates with the gear 11 about the intermediate portion of the spindle shaft 4 to rotate the shaft 4 about its own axis. The vacuum line 13 is connected to the rotary joint 14 on the top of the spindle shaft 4 and the axial bore 15 communicates the interior of the ware-holding chuck 6 at the bottom of the shaft 4 with the interior of the rotary joint 14. The improved heat resisting bearings 16 are used to mount the spindle 4 for rotation within the upper and lower support housings 8 and 17. The improved spindle height adjusting assembly is mounted on the upper support 8 and sets the level of the upper support 8 and the spindle 4 with respect to the lower support housing 17.

IMPROVED HEIGHT ADJUSTING ASSEMBLY

During a cycle of rotation of the burn-off machine turret 1 the level of the burner 5 remains constant, while the height of the spindle 4 and ware-holding chuck 6 must be varied from station to station in order to pick up the ware A from a conveyor, insert it into the ring burner 5 during the burn-off operation and then remove it and place it on another conveyor for further processing. The assembly for accomplishing this is perhaps best shown in FIG. 5 wherein the spindle 4 with the rotary joint 14 on its upper end is fixed to the support 8 and extends slidably through the support member 17 which is fixed to the turret 1. In order to vary the height of the spindle 4, and the ware-holding chuck 6 at its lower end, the upper support 8 has an associated cam roller 7 which rides on a suitably designed cam surface 9. The cam surface 9 is fixed on the stationary ring gear 10 which is mounted to the burn-off machine center post 2. It is apparent that as the axis of the roller is fixed with respect to the upper support 8, which in turn is fixed to the spindle 4, the level or height of the spindle 4 will be raised and lowered directly in proportion to the vertical movement of the roller 7 on the cam surface 9. Although the cam 9 and roller 7 arrangement raises and lowers the spindle 4 appropriately at the various stations, the ultimate level of the ware-holding chuck 6 in the ring burner 5 must be precisely set to produce ware of a uniform height.

To produce ware of a uniform height on a burn-off machine it is necessary to position the chuck which retains the ware at a uniform distance from the burner flame on each spindle. The lower spindle assembly and the chuck and burner components undergo thermal and mechanical deformation, and are subject to manufacturing tolerances that result in a variation from station to station in the distance of the ware retaining chuck above the burner flame.

The present invention provides mechanical means to precisely adjust the spindle level to reduce the variation in height of the burn-off machine chuck above the burner flame from station to station. To achieve the precise adjustment necessary the level of the roller 7 with respect to the support 8 must be precisely set to fix the limits of movement of the spindle 4 and chuck 6. This setting is accomplished by improved means for mounting the axle of the roller.

As seen in FIG. 5 an adjusting shaft 19 is mounted for rotation in a suitable bore 20 in a portion of the support 8. The shaft 19 is provided with portions of reduced diameter 21 and 22 at opposite ends, one of which 21 is bored to receive the axle 23 of the roller 7, the other of which 22 mounts a rotary knob 24. The shaft 19 is held against rotation in the bore 20 by means of a spring-loaded chisel type detent 25 which cooperates with a series of serrations 26 formed circumferentially on the surface of the shaft 19. The detent means 25 prevents rotation of the shaft 19 within the bore 20 during ordinary operation, however, the spring constant, detent angle, frictional forces and weight of the mechanism are so designed as to permit rotary adjustment of the shaft positioned by rotation of the knob 24. The knob 24 is provided with suitable markings 27 to indicate the precise differences between settings.

The height of the roller 7 with respect to the support 8 may be varied by rotation of the shaft 19. This is accomplished by the provision of an eccentric bore 28 in the reduced diameter end portion 21 of the shaft 19 which accommodates the axle 23 of the roller 7. An end view of this arrangement is shown in FIG. 6, and a top view in FIG. 4. In this arrangement the center line $a$ of the axle 23 of the roller 7 will be displaced from the axis $b$ of the shaft 19. Rotation of the shaft 19 then about its axis $b$ will cause the center line $a$ of the axle 23 to be displaced about a circular path with $b$ as its center. This circular movement of the roller axle $a$ will vary the height of the roller 7 with respect to the support 8 in which $b$ is fixed. Thus the ultimate level of the ware-holding chuck 6 with respect to the ring burner 5 may be set by adjusting the height of the roller 7 with respect to the support 8. This setting may be readily accomplished by rotation of the knob 24 on the end of the shaft 19.

By virtue of this construction then the proper level for the ware with respect to the ring burner may be set by the simple rotation of an adjusting knob without the need for adjusting the mounting assembly or the contour of the cam track.

IMPROVED VACUUM LINE CONTROL VALVE

A further means for compensating for the extreme heating effects to which the ware-holding chuck is subjected during the burning-off operation has been incorporated into the vacuum supply line. As previously stated a source of vacuum is communicated to the interior of the ware-holding chuck 6 to hold the ware A therein during the operating cycle. The vacuum supply line 13 is opened and closed by a two-position control valve 12 located on the rotating central distribution manifold 3a. As best shown in FIGS. 7 and 8 the valve body 29 is of the spool type having a port 30 and a land 31 near its center. A roller 32 is provided on its upper end which cooperates with suitable cam means 33 and 34 mounted on the fixed portion 35 of the distributor 3. As shown in FIG. 7 the lower cam 33 acts to raise the valve spool 29 in its bore to open the vacuum passage 36 to supply line 13, while the upper cam 34 shown in FIG. 8 drives the spool 29 downwardly to close-off communication in the vacuum passage. A spring loaded detent 37 is provided which holds the valve spool 29 in the open or closed position by engaging appropriate grooves 38 or 39, respectively, on the lower end of the spool. Suitable seals 40 are also provided on opposite sides of the central portion of the spool 29 to minimize the leakage of atmospheric air into the passage 36.

In operation, the portion 3a of the distributor 3 in which the valve 12 is mounted is rotated with the burn-off turret 1. The cams 33 and 34 are provided on the upper distributor section 35 which is fixed to the machine center post 2. At the appropriate stations, as the turret 1 rotates, the cams will variously contact the roller 32 to snap the valve spool 29 to the opened or closed position communicating or cutting-off the source of vacuum to the ware-holding spindle.

The improved valve of the present invention is provided with an axial bore 41 extending from its top to the central portion and opening on the surface of the land 31. As will be seen upon reference to FIGS. 7 and 8, when the valve 29 is in the opened position the opening 42 of this bore 41 will be closed by the sides of the bore in the distributor body 3a. However, when the valve 29 is snapped to the closed position cutting-off the source of vacuum this bore opening 42 will communicate with the line 13 permitting the rush of cooling atmospheric air to the ware-holding spindle 4. Thus, as a result of this arrangement when the vacuum line 36 is cut-off from the line 13 atmospheric air is permitted to rush through to the spindle system cooling the heated parts and providing for rapid ejection of the ware from the ware-holding chuck 6.

IMPROVED HEAT RESISTANT BEARINGS

In the past bearings such as the bearing 16 used to mount the spindle for rotation in the upper support 8 and rotation and reciprocation in the lower support 17 have been found to have a very short life under the extreme heating effects inherent in the burn-off operation. Normally grease or oil is used as a lubricant on the rotary and sliding surfaces of the spindle and undergoes chemical and mechanical changes when subjected to the heat from the burn-off machine burners. These chemical and mechanical changes result in deposits of hard carbon-like material on the spindle which causes function failure due to mechanical interference and excessive wear on the bearing surfaces. As a result these machines have required constant and costly maintenance.

A further improvement of the present invention consists in an improved construction for bearings, bushings or other members with contacting surfaces which has been found to give long life operation with a minimum of deterioration in this high temperature environment. This improvement comprises the use of self-lubricating members formed of porous matrices of metal and graphite impregnated with polytetrafluoroethylene, such as Du Pont's "Teflon." The bearings, for example, are formed from bar stock or sintered bronze and graphite with about 15% porosity impregnated with Teflon. These bearings have been found to operate satisfactorily at the elevated temperatures with no additional lubrication other than the Teflon. The adverse effects due to the excessive heating have been found to be negligible over a long period of use.

It will thus be seen that an improved burn-off machine has been provided which communicates cooling atmospheric air to the ware-holding spindle. In addition, adverse heating effects are alleviated by the provision of superior heat resisting members for mounting the spindle and by provision of precise height adjustment of the ware-holding spindle above the burners.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a glass burn-off machine having a spindle for holding and rotating the ware during the burn-off operation the improvement which comprises means for mounting the spindle above the burn-off means, a roller on said mounting means, cam means on which the roller rides for raising and lowering the mounting means at the desired stations in the burn-off cycle, and rotatable means within said roller for adjusting the level of said roller with respect to said mounting means.

2. In a vacuum system for a glass burn-off machine having a spindle for holding and rotating the ware during the burn-off operation the improvements which comprise valve means for controlling the communication of a vacuum to the spindle for holding the ware thereon, said valve means communicating cooling atmospheric air to the spindle when the vacuum is cut off, means for mounting the spindle above the burn-off means, a roller on said mounting means, cam means on which the roller rides for raising and lowering the mounting means at the desired stations in the burn-off cycle and rotatable means within said roller for adjusting the level of said roller with respect to said mounting means and heat-resistant bearing means between said spindle and said mounting means to facilitate both rotary and sliding motion, said bearings comprising a mixture of bronze and graphite impregnated with polytetrafluoroethylene.

3. A system as claimed in claim 2 in which said valve means comprises a spool having a bore which communicates the vacuum passage in the spindle to the atmosphere when the valve is in the closed position.

4. A system as claimed in claim 2 in which the valve means comprises a spool having two annular grooves adjacent one end and a spring loaded detent which respectively engages said grooves to hold the valve in the open and closed position.

5. A system as claimed in claim 2 wherein the valve means is mounted on the distributor manifold of the burn-off machine.

6. A system as claimed in claim 2 wherein said bearings comprise sintered bronze and graphite of 15% porosity.

7. In a ware-holding system for a glass burn-off machine having a spindle for holding and rotating the ware in the burn-off operation and having means for positioning said spindle over a burn-off means, the improvement which comprises heat-resistant bearing means supporting said spindle over said burn-off means for facilitating rotary and sliding motion, said bearing means comprising a porous matrix of sintered metal and graphite impregnated with polytetrafluoroethylene.

8. The system as claimed in claim 7 wherein said bearings comprise sintered bronze and graphite of about 15% porosity.

9. In a system as claimed in claim 7 wherein the metal is bronze.

10. In a system as claimed in claim 7 wherein the porosity is about 15%.

11. In a system as claimed in claim 7 wherein the polytetrafluoroethylene is impregnated in the bearing after the bearing is shaped.

12. In a glass burn-off machine having a spindle for holding and rotating the ware during the burn-off operation the improvement which comprises means for mounting the spindle above the burn-off means, a roller on said mounting means, cam means on which the roller rides for raising and lowering the mounting means at the desired stations in the burn-off cycle, and rotatable means on said mounting means for adjusting the level of said roller with respect to said mounting means, said rotatable adjusting means comprising a rotatable shaft mounted on a spindle mounting means and having an axially eccentric bore which accommodates the axle of said roller.

13. A system as claimed in claim 12 in which said shaft has a number of serrations on its surface and a spring loaded detent for engaging a serration to hold the shaft in a fixed position.

14. A system as claimed in claim 12 in which said shaft has an end of reduced diameter which accommodates said roller and an end of reduced diameter which accommodates an adjustment knob.

15. In a vacuum system for a glass burn-off machine having a spindle for holding and rotating the ware during the burn-off operation the improvements which comprise valve means for controlling the communication of a vacuum to the spindle for holding the ware thereon, said valve means communicating cooling atmospheric air to the spindle when the vacuum is cut off, means for mounting the spindle above the burn-off means, a roller on said mounting means, cam means on which the roller rides for raising and lowering the mounting means at the desired stations in the burn-off cycle and rotatable means on said mounting means for adjusting the level of said roller with respect to said mounting means and heat-resistant bearing means between said spindle and said mounting means to facilitate both rotary and sliding motion, said rotatable adjusting means comprising a rotatable shaft mounted on the spindle mounting means and having an axially eccentric bore which accommodates the axle of said roller, said bearings comprising bronze and graphite impregnated with polytetrafluoroethylene.

References Cited
UNITED STATES PATENTS

| | | | |
|---|---|---|---|
| 2,644,274 | 7/1953 | Bailey | 65—272 |
| 2,811,815 | 11/1957 | Eldred | 65—260 X |
| 2,995,462 | 8/1961 | Mitchell et al. | 308—238 X |
| 3,175,704 | 3/1965 | McCreary | 65—260 X |
| 3,369,924 | 2/1968 | Duggins et al. | 308—238 X |

ARTHUR D. KELLOGG, Primary Examiner

U.S. Cl. X.R.

65—272, 285, 374